United States Patent [19]

Ohkubo

[11] 4,370,042
[45] Jan. 25, 1983

[54] READY-TO-FLASH CONDITION INDICATING DEVICE FOR A CAMERA

[75] Inventor: Yuji Ohkubo, Ohmiya, Japan

[73] Assignee: Nippon Kogaku K.K., Tokyo, Japan

[21] Appl. No.: 260,382

[22] Filed: May 4, 1981

[30] Foreign Application Priority Data

Jun. 3, 1980 [JP] Japan .............................. 55-76891[U]

[51] Int. Cl.³ .......................... G03B 15/05; G03B 7/26
[52] U.S. Cl. .................................... 354/127; 354/145; 354/289
[58] Field of Search .............................. 354/27, 32–35, 354/53, 60 R, 60 E, 60 L, 60 F, 127, 128, 139, 145, 149, 289; 315/241 P, 129, 136

[56] References Cited
U.S. PATENT DOCUMENTS
4,295,717 10/1981 Kitigawa ........................ 354/128 X Primary Examiner—William B. Perkey
Attorney, Agent, or Firm—Fitzpatrick, Cella, Harper & Scinto

[57] ABSTRACT

A device in a camera is provided with a light-emitting element driven by a signal current from an electronic flash device to emit light and indicate the ready-to-flash condition of the electronic flash device, a current control circuit series-connected to the light-emitting element to control a current flowing to the light-emitting element, an integrated circuit operative in response to the signal current from the electronic flash device, and a limiting circuit for detecting a voltage related to the combined voltage of the light-emitting element and the current control circuit and limiting an applied voltage applied to the integrated circuit so as to be below a predetermined value when said voltage exceeds a predetermined value.

4 Claims, 2 Drawing Figures

READY-TO-FLASH CONDITION INDICATING DEVICE FOR A CAMERA

BACKGROUND OF THE INVENTION

1. Field of the Invention

This invention relates to an indicating device for use in a camera for indicating, by the driving current from an electronic flash device, that the main capacitor of the electronic flash device has been charged to a predetermined value, that is, the electronic flash device is ready to emit flashlight.

2. Description of the Prior Art

The indicating device of this type employs a light-emitting element such as LED as an indicating element and this leads to a disadvantage that if the power source voltage of the electronic flash device fluctuates, the luminance of the light-emitting element is varied and the indication thereby becomes less easy to visually perceive. To eliminate such disadvantage, a constant current circuit may be series-connected to the light-emitting element and the constant current thereof may be used as the current for turning on the light-emitting element. Such constant current circuit may be provided within either the electronic flash device or the camera. However, if it is provided within the electronic flash device, there will occur a difficulty. That is, a camera permits various electronic flash devices to be mounted thereto and therefore, in order that the luminance of the light-emitting element within the camera may always be rendered substantially constant irrespective of the type of the electronic flash device mounted to the camera, the outputs of the constant current circuits of the various electronic flash devices must be equalized. This is difficult to achieve. Therefore, it is desirable that the constant current circuit be provided within the camera.

On the other hand, there is already known a tuned shutter time automatically setting circuit for automatically setting, for example, the shutter time of the electric shutter of the camera to the synchronizing time with which flash synchronizes, namely, the shutter time for which the shutter is fully open, in response to said driving current from the electronic flash device when mounted to a camera. Such synchronizing shutter time automatically setting circuit has generally been made into an integrated circuit.

Therefore, in a case where a camera is provided with such a synchronizing shutter time automatically setting circuit made into an integrated circuit and said constant current circuit series-connected to the light-emitting element, when the power source voltage of the electronic flash device is very great and the voltage across the series circuit comprising the constant current circuit and the light-emitting element is greater than the power source voltage of the camera, this great voltage is applied to the synchronizing shutter time automatically setting circuit made into an integrated circuit. This may lead to an undesirable possibility that the synchronizing shutter time automatically setting circuit malfunctions or is damaged.

Such malfunctioning or damage of the integrated circuit such as the synchronizing shutter time automatically setting circuit may occur not only in a case where the constant current circuit is connected to the aforementioned light-emitting element, but also in a case where provision is made of a current control circuit for controlling or limiting the current flowing to the light-emitting element for some purpose or other.

SUMMARY OF THE INVENTION

It is the object of the present invention to prevent, in the circuit of a camera wherein a current control circuit is series-connected to a light-emitting element for indicating that the electronic flash device is ready to produce flashlight, any malfunctioning or damage of the camera side integrated circuit responsive to the signal current from the electronic flash device.

The invention will become fully apparent from the following detailed description of some embodiments thereof taken in conjunction with the accompanying drawings.

DESCRIPTION OF THE PREFERRED EMBODIMENTS

Figure 1:
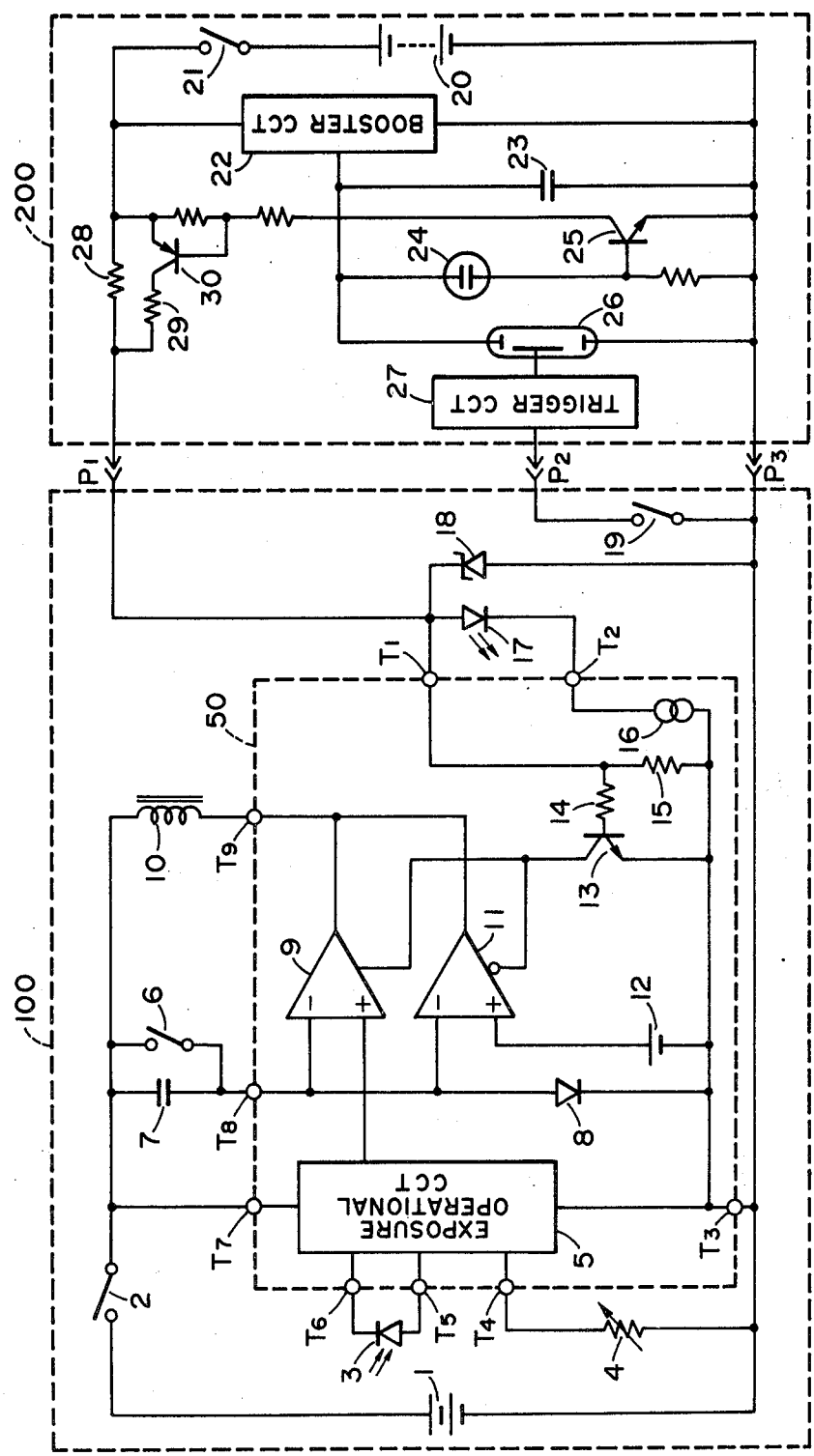
FIG. 1 is a diagram showing the circuit of a camera having a ready-to-flash condition indicating device according to an embodiment of the present invention.

Referring to FIG. 1, a camera side circuit 100 and an electronic flash device side circuit 200 are connected together by connectors $P_1$, $P_2$ and $P_3$.

The camera side circuit 100 will first be described.

A camera side power source 1 supplies power to the circuit 100 through a main switch 2. A photodiode 3 produces an output corresponding to the object brightness and applies this output as the object brightness information to an exposure operational circuit 5. The resistance value of a variable resistor 4 is determined in accordance with the film speed and the set value of an aperture value, whereby an output as the film speed and aperture value information is applied to the exposure operational circuit 5. The exposure operational circuit 5 operates the object brightness information and the film speed and aperture value information, calculates a proper shutter time and produces an output. A timing switch 6 is opened in response to the opening operation of a shutter. When the switch 6 is opened, a timer capacitor 7 starts to be charged by the power source 1 through a diode 8 and produces an output voltage corresponding to the opening time of the shutter. A comparator 9 compares the output of the exposure operational circuit 5 with the output of the timer capacitor 7 and, when the two outputs have assumed a predetermined relation, it produces an H level output, deenergizes a shutter closing operation hampering magnet 10 and closes the shutter. When the comparator 9 is thus used, there is obtained a shutter time corresponding to the object brightness. A comparator 11 compares the output voltage of a reference voltage source 12 with the output voltage of the timer capacitor 7 and, when the two outputs have assumed a predetermined relation, it produces an H level output, deenergizes the shutter closing operation hampering magnet 10 and closes the shutter. When the comparator 11 is used, there is obtained a synchronizing shutter time of an electronic flash device. A transistor 13 and resistors 14, 15 together constitute a shutter change-over circuit. When flashlight photography is effected with the electronic flash device 200 mounted to the camera 100, this shutter change-over circuit operates the comparator 11, renders the comparator 9 inoperative and automatically sets the shutter to the synchronizing shutter time of the electronic flash device. On the other hand, when flashlight photography is not effected, this shutter change-over circuit renders the comparator 11 inoperative, renders the comparator 9 operative and controls the shutter to a shutter time corresponding to the object brightness. A constant current circuit 16 is series-connected to a ready-to-flash condition indicating light emitting diode 17 and supplies a constant current to the same. The light emitting diode 17 is observed in the view finder of the camera. A Zener diode 18 is parallel-connected to the series circuit comprising the constant current circuit 16 and the light emitting diode 17. This Zener diode 18 limits a voltage applied to the series circuit 16, 17 so that such voltage does not exceed a predetermined value. A circuit portion 50 encircled by a dotted line is made into an integrated circuit, and terminals $T_1$–$T_9$ are provided in the circuit portion 50.

The electronic flash device side circuit 200 will now be described.

An electronic flash device side power source 20 supplies power to the circuit 200 through a switch 21. A booster circuit 22 charges a main capacitor 23. When the main capacitor 23 is charged to a predetermined value or greater, a neon tube 24 is turned on. Thereby, it is indicated on the electronic flash device side that the electronic flash device has become ready to emit flashlight. By the turn-on of this neon tube 24, a transistor 25 is turned on, namely rendered conductive. When the synchro switch 19 of the camera is closed, a trigger circuit 27 causes a flashlight discharge tube 26 to start producing flashlight. A current limiting resistor 28 is connected between the power source 20 and the terminal $P_1$. A series circuit of a resistor 29 and a transistor 30 is parallel-connected to the resistor 28. The transistor 30 is controlled by ON/OFF of the transistor 25. When the transistor 30 is in its ON state, the current from the power source 20 flows through both of the parallel-connected resistors 28 and 29 to the camera side from the terminal $P_1$ and on the other hand, when the transistor 30 is in its OFF state, the current from the power source 20 flows only through the resistor 28 to the camera side from the terminal $P_1$. Therefore, the current from said power source assumes a great value when the transistor 30 is in its ON state, and assumes a small value when the transistor 30 is in its OFF state. This small current renders the transistor 13 conductive on the camera side while it substantially turns off the light-emitting diode 17, and said great current renders the transistor 13 conductive and also turns on the light-emitting diode 17.

Operation will now be described.

When the electronic flash device is mounted to the camera, the two circuits 100 and 200 are connected together by the connectors $P_1$–$P_3$. The main switches 2 and 21 of the circuits 100 and 200 are closed. By the closing of the switch 21, the power source 20 charges the main capacitor 23 through the booster circuit 22. During the time that the charging voltage of this capacitor 23 is below a predetermined value, the neon tube 24 remains turned off and the transistors 25 and 30 are also in their OFF state. Accordingly, at this time, a small current flows from the power source 20 into the camera side circuit 100 via the switch 21 and only through the current limiting resistor 28. Part of this small current flows to terminal $T_1$ and resistor 14 to turn on the transistor 13. The comparator 9 is rendered inoperative by the turn-on of the transistor 13. However, the comparator 11 is operated by the turn-on of the transistor 13. Accordingly, by the comparator 11, the shutter is set to a shutter time synchronizing with the electronic flash device. On the other hand, the remainder of the small current from the connector $P_1$ flows into the light-emitting diode 17, but since the current value thereof is very small, the light-emitting diode remains substantially turned off. By this turn-off, it is indicated that the charging of the capacitor 23 is still insufficient.

When the capacitor 23 is charged to a predetermined value, the neon tube 24 is turned on, the transistor 25 is turned on and the transistor 30 is turned on. At this time, the resistor 29 is parallel-connected to the resistor 28 and the current from the power source 20 flows through both of the parallel-connected resistors 28 and 29. Thus, this current becomes sufficiently greater than the aforementioned small current, so that the transistor 13 is held in its ON state and the light-emitting diode 17 is turned on. By this turn-on, it is indicated on the camera side that the capacitor 23 has been sufficiently charged and the electronic flash device is ready to emit flashlight.

Next, when the shutter is fully opened by shutter release, the synchro switch 19 is closed, the trigger circuit 27 operates and the flashlight discharge tube 26 starts emitting flashlight.

Also, by shutter release, the timing switch 6 is opened and the timer capacitor 7 starts to be charged and, when the charging voltage thereof comes to assume a predetermined relation with the voltage of the reference voltage source 12, the comparator 11 produces an H level output, whereby the shutter closing hampering magnet is deenergized and the shutter is closed. In this manner, flashlight photography is terminated.

Description has been made of a case where the circuit operates normally. However, if the voltage of the power source 20 is very great, the voltage applied to a series circuit comprising the light-emitting diode 17 and the constant current circuit 16 will become great because the current flowing through said series circuit is limited to a predetermined value by the constant current circuit 16, and the anode potential of the light-emitting diode 17 will rise. When this anode potential has become much higher than the voltage of the camera side power source 1, there is an undesirable possibility that the IC 50 causes malfunctioning or is damaged because that voltage is being applied from the terminal $T_1$ to the IC 50. To prevent this, a Zener diode 18 is provided as a limiting circuit for limiting the voltage applied from the circuit 200 to the IC 50. This Zener diode 18 detects the anode potential of the light-emitting diode 17 and, when that potential reaches a predetermined value, it clamps that potential to the predetermined value. The potential the Zener diode 18 clamps is chosen to such a value that the IC 50 operates normally and the light-emitting diode 17 can be sufficiently turned on.

In the embodiment shown in FIG. 1, the Zener diode 18 may be replaced by a plurality of diode stacks. Also, the Zener diode 18 may be incorporated in the IC 50.

Figure 2:
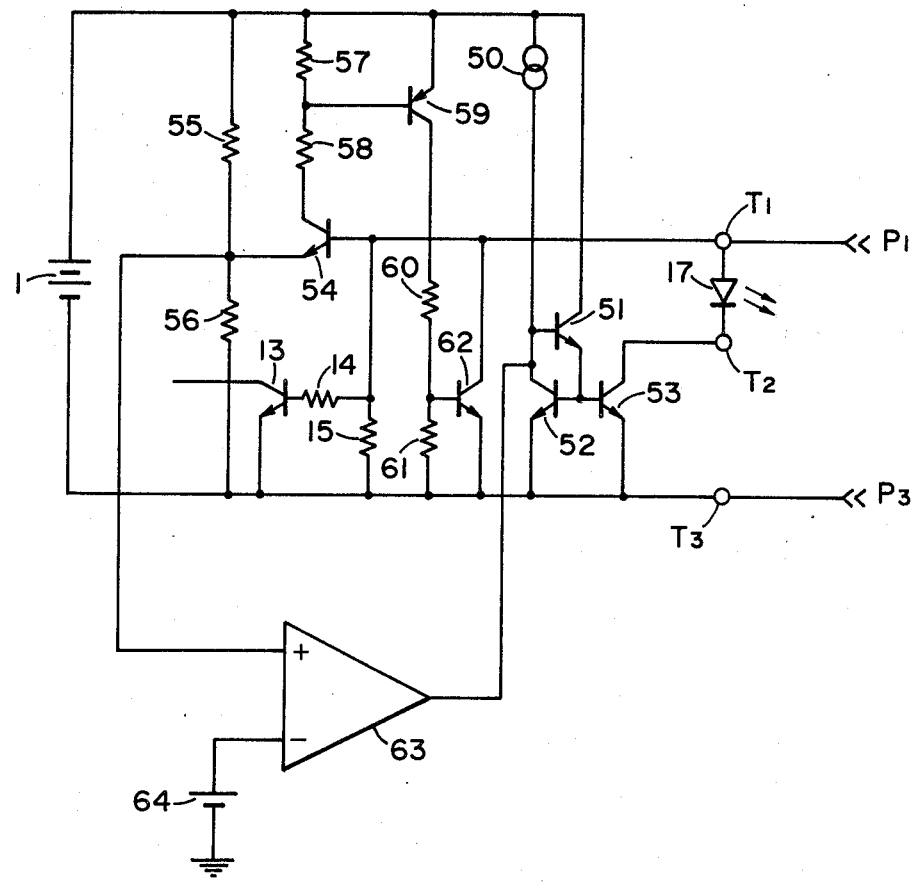
FIG. 2 is a diagram showing the limiting circuit in the circuit of a camera according to another embodiment of the present invention.

In the first embodiment of FIG. 1, the limiting circuit for limiting the voltage applied to the IC 50 from the circuit 200 is provided by the Zener diode 18, but in a second embodiment shown in FIG. 2, this limiting circuit is provided by a detecting circuit for detecting the applied voltage and a shunt circuit for shunting the current flowing to the light-emitting diode in accordance with the output of the detecting circuit.

In FIG. 2, transistors 51–53 together constitute a current mirror circuit and the same current as the constant current of a constant current circuit 50 may flow to the transistor 53 series-connected to the light-emitting diode 17. Thus, the constant current circuit 50 and the current mirror circuit 51–53 together constitute a constant current source for controlling to a predetermined value the current flowing to the light-emitting diode 17. Voltage dividing resistors 55 and 56 divide the voltage of the camera side power source 1. A potential detecting transistor 54 compares the divided voltage of the power source 1 with the anode potential of the light-emitting diode 17 and is turned on when the anode potential has become greater by a predetermined value than the divided power source voltage. The transistor 54 and the voltage dividing resistors 55, 56 together constitute a voltage detecting circuit. When the transistor 54 is turned on, a current flows to resistors 57 and 58, a transistor 59 is turned on and a current flows to resistors 60 and 61 and accordingly, a transistor 62 is turned on. This transistor 62 constitutes a shunt circuit. A comparator 63 compares the voltage of the power source 1 divided by the resistors 55, 56 with the voltage of a reference voltage source 64. The other construction not shown in FIG. 2 is identical to the construction of FIG. 1.

Operation will now be described.

Description will first be made of a case where the voltage of the electronic flash device side power source 20 (FIG. 1) is not so high. When the main capacitor 23 is charged up, the light-emitting diode 17 is turned on. The value of the current then flowing to the light-emitting diode 17 is the same as the value of the constant current from the constant current source 50 due to the action of the current mirror circuit 51–53 and therefore, the luminance of the light-emitting diode 17 is always constant. Since the voltage of the power source 20 is not so high, the anode potential of the light-emitting diode 17 does not rise so much. Accordingly, the transistor 54 is turned off and no current flows to the resistors 57 and 58, and the transistor 59 is also turned off and no current flows to the resistors 60 and 61, and the transistor 62 is in its OFF state. Accordingly, the shunt circuit does not work in this case.

However, where the voltage of the electronic flash device side power source 20 is very high, the current flowing to the light-emitting diode 17 is controlled to a predetermined current value as described above and therefore, the anode potential of the light-emitting diode 17, namely, the potential applied to the circuit portion 50 made into IC, rises. Thereupon, the transistor 54 is turned on, the transistor 59 is turned on and the transistor 62 is turned on. Thus, the shunt circuit 62 is parallel-connected to the series circuit of the light-emitting diode 17 and transistor 53, and this by-passes the current from the power source 20. Accordingly, the rise of the anode potential of the light-emitting diode 17 is limited.

Also, when the camera side power source 1 has been consumed and its voltage has dropped below a level sufficient to operate the exposure control system of the camera side circuit 100 normally, the voltage of the power source 1 divided by the resistors 55 and 56 drops relative to the voltage of the reference voltage source 64 and the comparator 63 detects this voltage drop and turns off the transistors 51, 52 and 53. Accordingly, the light-emitting diode 17 is forcibly turned off. When the voltage of the camera side power source 1 has thus dropped and it has become impossible to obtained a synchronizing shutter time, the light-emitting diode 17 is turned off independently of the charged condition of the main capacitor and thus, flashlight photography which would otherwise end in a failure may be realized.

Also, due to the transistor 53 being turned off, the anode voltage of the light-emitting diode 17 rises, but again in this case, the transistor 54 is turned on as described in connection with the operation of the aforementioned limiting circuit, whereby the transistor 62 is turned on and accordingly, the rise of the anode voltage of the light-emitting diode 17 is limited.

In the above-described embodiments, the substance of the IC 50 responsive to the signal current from the electronic flash device has been the synchronizing shutter time automatically setting circuit 11, 12, 13, 14, 15. However, this circuit may be any circuit which will be responsive to the signal from the flash device. This circuit may be, for example, a circuit which will automatically set the aperture value of the camera during flashlight photography or a circuit which will extinguish unnecessary indication on the camera side during flashlight photography.

According to the present invention, as described above, the IC provided in the camera is prevented from malfunctioning or being damaged and this increases the reliability and durability of the camera for the operational function thereof.

I claim:

1. A device for use with an electronic flash device in a camera, comprising; a light-emitting element driven by a signal current from said electronic flash device for indicating the ready-to flash condition of said electronic flash device; a current control circuit series-connected to said light-emitting element to control a current flowing to said light-emitting element, an integrated circuit operative in response to said signal current from said electronic flash device; and a limiting circuit for detecting a voltage related to the combined voltage of said light-emitting element and said current control circuit and limiting said combined voltage to below a predetermined value when said detected voltage exceeds a predetermined value.

2. A device according to claim 1, wherein said current control circuit is a constant current circuit which controls to a predetermined value the current flowing to said light-emitting element, and further comprising a power source voltage detecting circuit (55, 56, 63, 64) for detecting the power source voltage of said camera and producing a detection output when said power source voltage is below a predetermined value, and means (51, 52, 53) for forcibly turning off said light-emitting element in response to said detection output.

3. A device according to claim 1, wherein said limiting circuit is constituted by a Zener diode.

4. A device according to claim 1, wherein said limiting circuit is constituted by a detecting circuit (54) for detecting the combined voltage, and a shunt circuit (62) for shunting the current flowing to said light-emitting element in response to the output of said detecting circuit.

* * * * *